Nov. 23, 1954
G. E. LANGLOIS
2,695,324
HYDROCARBON PURIFICATION PROCESS
Filed May 16, 1952
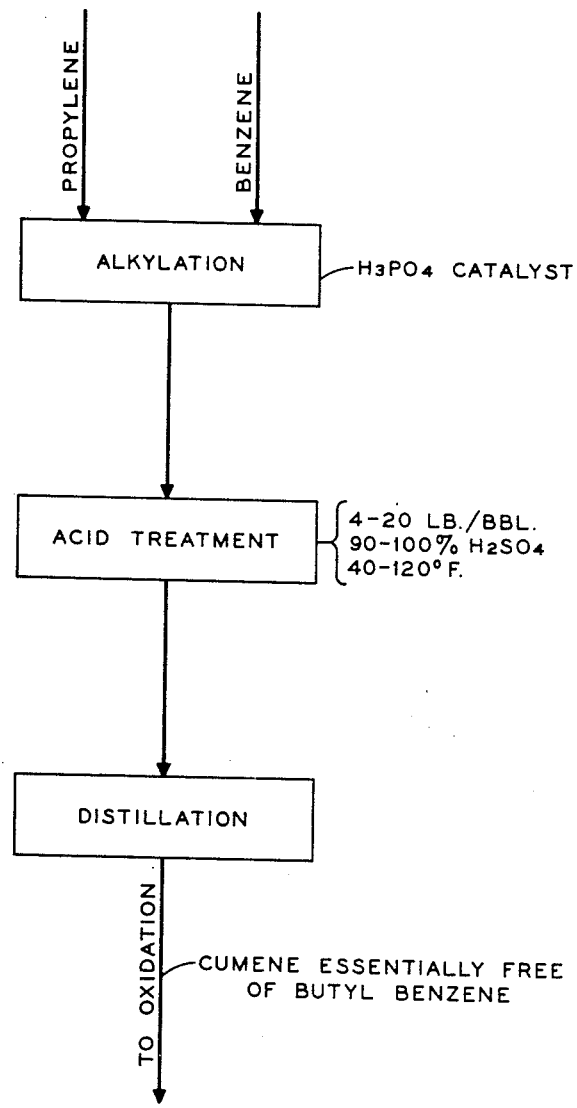
INVENTOR
GORDON E. LANGLOIS
BY
ATTORNEYS

United States Patent Office 2,695,324
Patented Nov. 23, 1954

2,695,324

HYDROCARBON PURIFICATION PROCESS

Gordon E. Langlois, El Cerrito, Calif., assignor to California Research Corporation, San Francisco, Calif., a corporation of Delaware Application May 16, 1952, Serial No. 288,321

5 Claims. (Cl. 260—674)

This invention relates to a process for producing isopropyl benzene hydrocarbons essentially free of their butyl benzene homologues; more particularly, the invention relates to a process for producing cumene essentially free of butyl benzenes, cymenes essentially free of methyl butyl benzenes, and dimethyl isopropyl benzenes essentially free of dimethyl butyl benzenes.

The alkylation of benzene, toluene and the xylenes with propylene to produce cumene, the cymenes, and dimethyl isopropyl benzenes, respectively, is well known in the art. These materials, especially cumene, have been produced in large volumes for use as components of aviation gasolines. In the alkylation, the benzene hydrocarbon is contacted with a propylene containing gas in the presence of an alkylation catalyst under alkylating conditions. The number of alkylation catalysts effective in promoting the reaction, the methods by which they are prepared, and the manner of their use in the alkylation reaction are described in detail in the literature. Phosphoric acid catalysts such as the solid phosphoric acid catalyst prepared by mixing phosphoric acid with kieselguhr and extruding and calcining the mixture, the phosphoric acid film catalyst described in U. S. Patent No. 2,135,793, and bulk liquid phosphoric acid are especially effective. The alkylation is ordinarily conducted at temperatures ranging from about 200° F. to 600° F. and the aromatic hydrocarbon is usually present in substantial molar excess over the propylene in the reaction mixture in order to suppress polyalkylation. The alkylation reaction product contains as its principal components the isopropyl aromatic hydrocarbon and the di-isopropyl aromatic hydrocarbon, the former being present in substantially greater amount. Smaller amounts of other materials, especially butyl aromatic hydrocarbons, are present in the reaction mixture.

In working up the alkylation reaction product for the uses to which it has been put in the past, little difficulty has been encountered. In the usual practice the whole alkylation reaction product is fractionally distilled to separate the mono-isopropyl benzene hydrocarbon as the overhead fraction and polyisopropyl benzene hydrocarbons as the bottoms fraction. The fact that high boiling impurities in the reaction product found their way into the overhead fraction had no effect on the product quality in the use situations heretofore envisioned. For example, when cumene was prepared for use as an aviation blending stock, any butyl benzene contained in the alkylation reaction product mixture went overhead with the cumene. The butyl benzene was itself a useful component in the aviation fuel and no attempt was made to produce a butyl benzene-free cumene.

Recently a process for producing phenol from cumene has been developed. The essential steps of this process are: Oxidation of cumene with air to produce cumene hydroperoxide, cleavage of the cumene hydroperoxide with the aid of an acid catalyst to produce phenol and acetone, and recovery of these products from the cleavage mixture. In attempting to develop a commercial process for the production of phenol based on the relatively simple oxidation and cleavage reactions above mentioned, it was learned that the cumene charged to the oxidation step must be essentially free of butyl benzene in order to obtain good yields of specification phenol. A part of any butyl benzene present undergoes reactions during the oxidation step giving rise to undesirable impurities which are very difficult to remove and a part of the butyl benzene passes through the oxidation step unchanged and ultimately finds its way into the phenol product. A common commercial specification for phenol is that upon dilution with 15 parts of water, a clear solution is produced. Any turbidity indicates the presence of hydrocarbons and causes rejection of the phenol for most uses. The presence of butyl benzene in the phenol causes turbidity upon dilution with water. Accordingly, the amount of butyl benzene which can be tolerated in the cumene feed is extremely low.

Reduction of the butyl benzene content of cumene can be approached in two ways. The propylene employed in the alkylation of benzene to produce cumene can be highly purified with a view to making its butene content extremely low. Production of such pure propylene involves the use of expensive equipment and increased operating expense. In addition, the value of such a treatment can be seriously questioned since butyl benzene is produced during the alkylation of benzene even with pure propylene as a result of disproportionation, polymerization and fragmentation occurring under the usual conditions of the alkylation reaction. The amount of butyl benzene so produced will vary with the severity of alkylation conditions, but in the usual operation the amount will be sufficient to require that steps be taken to get rid of it even though pure propylene be charged to the alkylation reaction. In practical operation the propylene available for use as the alkylating agent will contain 2 to 4% of butenes. The other method of eliminating butyl benzenes from the cumene is to take a smaller cumene overhead fraction during the distillation of the crude alkylation reaction product. When benzene is alkylated with propylene using a phosphoric acid catalyst, from 85 to 93% of the total cumene contained in the alkylation reaction product can be recovered overhead before butyl benzenes begin to appear. This overhead fraction would constitute a suitable charge to the oxidation step of the process for producing phenol. If this practice is followed, the undistilled bottoms fraction contains not only the butyl benzenes and polyalkyl benzenes, but also it contains from 7 to 10% or more of the total cumene produced in the alkylation step. Rejection of so large a fraction of the desired product constitutes waste of a potentially useful material and imposes a severe economic burden on the process.

As phenol may be produced from cumene in the manner above described, so may cresols be produced from cymenes and xylenols from dimethyl isopropyl benzene. The presence of methyl butyl benzenes in the cymenes, or of dimethyl butyl benzenes in the dimethyl isopropyl benzenes, is undesirable in the same manner that the presence of butyl benzene is undesirable in cumene.

It is an object of this invention to provide a simple and effective method by which substantially all of the cumene produced by alkylating benzene with propylene can be recovered from the alkylation reaction product mixture without butyl benzene contamination.

Similarly, it is an object of this invention to provide a method by which cymenes and isopropyl xylenes can be recovered from crude alkylation reaction product mixtures free of contamination by their butyl benzene homologues.

It has been found that increased yields of butyl benzene-free isopropyl benzenes can be recovered from an isopropyl benzene-rich reaction product obtained by alkylating a benzene hydrocarbon having a molecular weight not exceeding that of xylene with propylene by intimately contacting the alkylation reaction product mixture with concentrated sulfuric acid, separating an acid phase and a hydrocarbon phase and fractionally distilling the hydrocarbon phase to separate an overhead fraction consisting essentially of the isopropyl benzene essentially free of its butyl benzene homologue.

In a more specific embodiment of the invention, increased yields of butyl benzene-free cumene are obtained from the cumene-rich reaction product, obtained by alkylating benzene with propylene, by intimately contacting the alkylation reaction product with concentrated sulfuric acid, separating a hydrocarbon phase and an acid phase, washing the hydrocarbon phase with aqueous caustic, and fractionally distilling the hydrocarbon phase.

The process steps of the invention are illustrated by the block flow sheet shown in the appended drawing.

The process of the invention is illustrated by the following examples:

EXAMPLE 1

Cumene was prepared by the alkylation of benzene with propene over a catalyst consisting of phosphoric acid on quartz. The benzene and a $C_3$ fraction containing propene were combined, preheated, and passed over a fixed bed of the catalyst. The reaction mixture was taken to a stabilizing column operated at 200 p. s. i. g. where the $C_3$ fraction containing propane and unreacted propene was taken overhead. The bottoms from the stabilizer were run to a topping still where unreacted benzene was taken overhead. This material was combined with the feed and recycled. The bottoms product from the topping still was a crude cumene fraction containing some butyl benzene and di-propyl benzene. The composition of the feed streams and the reaction conditions are given below:

*Composition of $C_3$ feed, mol percent*

| | |
|---|---|
| Ethene | 0.5 |
| Ethane | 12.0 |
| Propene | 32.3 |
| Propane | 52.5 |
| Butene | 0.9 |
| Butane | 1.4 |
| Pentene | 0.1 |
| Pentane | 0.3 |

*Composition of benzene feed*

| | Per cent |
|---|---|
| Benzene (by freezing point) | 99.9 |
| Nitrogen | <.01 |
| Sulfur | .02 |

*Reaction conditions*

| | |
|---|---|
| Catalyst: | Phosphoric acid on 28–35 mesh quartz |
| Average reaction temperature, °F | 350 |
| Reaction pressure, p. s. i. g | 250 |
| Feed rates, liquid volumes/vol. of catalyst/hr: | |
| $C_3$ fraction | 0.54 |
| Fresh benzene | 0.16 |
| Recycle benzene | 0.74 |
| Water content of total feed, wt. per cent | 0.05 |
| Propene conversion, per cent | 98 |
| Butyl benzene in crude cumene, per cent | 1.6 |

The feed compositions and operating conditions set out above are representative of those which may be employed in producing cumene for oxidation to phenol. Both the benzene and propylene are essentially free of sulfur and nitrogen. The butene content of the propylene stream is typical for economic large scale operation where butene contents in the range 1 to 4 mol per cent based on propylene may be expected.

EXAMPLE 2

One portion of the alkylation reaction product produced in Example 1 was fractionally distilled in a 42-plate Oldershaw column at a 10:1 reflux ratio. The overhead was collected in small fractions. 93.2% of the total cumene contained in the charge was taken overhead before butyl benzene appeared. The butyl benzene contents of the subsequent fractions are tabulated below:

| Cumene overhead, percent of total cumene in charge | Butyl benzene content of fraction |
|---|---|
| 93.2–94.2% fraction | 0.74% butyl benzene. |
| 94.2–95.2% fraction | 0.23% butyl benzene. |
| 95.2–96.3% fraction | 0.20% butyl benzene. |
| 96.2–97.3% fraction | 1.9% butyl benzene. |
| 97.3–98.3% fraction | 2.4% butyl benzene. |
| 98.3–99.5% fraction | 3.2% butyl benzene. |
| 99.5–100% fraction | 57% butyl benzene. |

EXAMPLE 3

A second portion of the alkylation reaction product produced in Example 1 was intimately contacted with 96% pure sulfuric acid at 80° F. for 15 minutes. The acid dosage was at the rate of 8 pounds per barrel. The acid-hydrocarbon mixture was settled to separate an upper phase and a lower acid phase. The hydrocarbon phase was caustic washed and then was distilled following exactly the same distillation procedure as that indicated in Example 2. As in Example 2, the overhead fraction amounting to 93.2% by volume of the total cumene available in the charge contained no butyl benzenes. The butyl benzene contents, if any, of the succeeding fractions are shown in the following tabulation:

| Cumene overhead, weight percent of cumene in charge | Butyl benzene content of fraction |
|---|---|
| 93.2–94.2% fraction | 0.0% butyl benzene. |
| 94.2–95.2% fraction | 0.0% butyl benzene. |
| 95.2–96.2% fraction | 0.0% butyl benzene. |
| 96.2–97.3% fraction | 0.0% butyl benzene. |
| 97.3–98.3% fraction | 0.0% butyl benzene. |
| 98.3–99.5% fraction | 0.0% butyl benzene. |
| 99.5–100% fraction | 36% butyl benzene. |

In Example 2, 93.2% of the total available cumene was recovered on a butyl benzene-free basis. In Example 3, 99.5% of the total available cumene was recovered on a butyl benzene-free basis. The acid treating step has the effect of substantially increasing the production of cumene suitable for conversion to phenol by the cumene hydroperoxide route.

Toluene and xylene were alkylated with the propylene stream described in Example 1. The crude reaction products were subjected to fractional distillation before and after acid treating in the manner described in Example 3. The yields of methyl butyl benzene-free cymene and dimethyl butyl benzene-free dimethyl isopropyl benzene were substantially increased by the acid treating step.

The acid treatment described in Example 3 above exemplifies the preferred treatment. It has been found that the amount of acid, concentration of acid, and temperature of the acid treating step and contact time of the treatment can be varied within the ranges indicated below. The amount of acid employed can be varied in the range from 4 pounds per barrel to 20 pounds per barrel of crude alkylation reaction product. The acid concentration can be varied in the range from about 90% to about 100% calculated as $H_2SO_4$. Lower acid concentrations are relatively ineffective even at high dosages and higher concentrations tend to increase product loss by sulfonation. The concentration preferably is in the range from about 94 to 98% calculated as $H_2SO_4$. The temperature of the acid treatment can be conducted in the range from about 40° F. to 120° F. Lower temperatures require excessively long contact times and higher temperatures cause increased loss due to sulfonation. Normally, the prevailing atmospheric temperature is suitable for the treatment and neither heating nor cooling apparatus is required. The contact time may be varied in the range from about 2 minutes to about 1 hour. The dosage and contact time will vary inversely with the acid concentration, all within the ranges set out above, and the employment of higher temperatures will permit the use of acid of lower concentration. For almost any practical situation that will be encountered, treatment with 7 to 12 pounds of 94 to 98% acid at atmospheric temperature will be effective.

I claim:

1. In a process for producing an isopropyl aromatic hydrocarbon by alkylating a benzene hydrocarbon having a molecular weight not exceeding that of xylene with propylene in the presence of a phosphoric acid catalyst as the sole active catalytic agent, the method of increasing the yield of isopropyl benzene hydrocarbon substantially free of its butyl benzene homologue obtainable by fractional distillation of the alkylation product which comprises intimately contacting the alkylation reaction product with 90 to 100% sulfuric acid, separating an acid phase and a hydrocarbon phase and fractionally distilling the hydrocarbon phase to separate an overhead fraction consisting essentially of the isopropyl benzene essentially free of its butyl benzene homologue.

2. A process for obtaining increased yields of butyl benzene-free cumene from the cumene-rich reaction product obtained by alkylating benzene with propylene in the presence of a phosphoric acid catalyst as the sole active catalytic agent, which comprises intimately contacting the reaction product with 90 to 100% sulfuric acid at a temperature in the range from 40 to 120° F., separating a hydrocarbon phase and an acid phase and fractionally distilling the hydrocarbon phase to recover cumene substantially free of butyl benzenes overhead.

3. A process for obtaining increased yields of butyl benzene-free cumene from the cumene-rich reaction product obtained by alkylating benzene with propylene contaminated with minor amounts of butenes in the presence of a phosphoric acid catalyst as the sole active catalytic agent, which comprises intimately contacting the reaction product with 4 to 20 pounds per barrel of 90 to 100% sulfuric acid at a temperature in the range from 40 to 120° F., separating a hydrocarbon phase and an acid phase and fractionally distilling the hydrocarbon phase to recover cumene substantially free of butyl benzenes overhead.

4. A process for obtaining increased yields of methyl butyl benzene-free cymene from a cymene-rich reaction product obtained by alkylating toluene with propylene in the presence of a phosphoric acid catalyst as the sole active catalytic agent, which comprises intimately contacting the reaction product with 90 to 100% sulfuric acid, separating a hydrocarbon phase and an acid phase and fractionally distilling the hydrocarbon phase to recover cymene substantially free of methyl butyl benzenes as the overhead fraction.

5. A process for obtaining increased yields of methyl butyl benzene-free cymene from a cymene-rich reaction product obtained by alkylating toluene with propylene contaminated with minor amounts of butenes in the presence of a phosphoric acid catalyst as the sole active catalytic agent which comprises intimately contacting the reaction product with 4 to 20 pounds per barrel of 90 to 100% sulfuric acid at a temperature in the range from 40 to 120° F., separating a hydrocarbon phase and an acid phase and fractionally distilling the hydrocarbon phase to recover cymene substantially free of methyl butyl benzenes as the overhead fraction.

References Cited in the file of this patent

UNITED STATES PATENTS

| Number | Name | Date |
|---|---|---|
| 2,143,493 | Stanley et al. | Jan. 10, 1939 |
| 2,199,564 | Ipatieff et al. | May 7, 1940 |
| 2,382,318 | Ipatieff et al. | Aug. 14, 1945 |